United States Patent
Dutt et al.

(10) Patent No.: US 10,982,637 B2
(45) Date of Patent: Apr. 20, 2021

(54) ROLLER TAPPET FOR A PISTON PUMP, PISTON PUMP

(71) Applicant: Robert Bosch GmbH, Stuttgart (DE)

(72) Inventors: Andreas Dutt, Stuttgart (DE); Florian Fritz, Leonberg (DE); Gerhard Meier, Schorndorf (DE); Markus Majer, Aichwald (DE); Martin Hoeller, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 198 days.

(21) Appl. No.: 16/336,516

(22) PCT Filed: Sep. 7, 2017

(86) PCT No.: PCT/EP2017/072468
§ 371 (c)(1),
(2) Date: Mar. 26, 2019

(87) PCT Pub. No.: WO2018/059900
PCT Pub. Date: Apr. 5, 2018

(65) Prior Publication Data
US 2020/0370524 A1    Nov. 26, 2020

(30) Foreign Application Priority Data

Sep. 29, 2016 (DE) .................. 10 2016 218 909.3

(51) Int. Cl.
*F02M 59/10* (2006.01)
*F02M 59/44* (2006.01)
(Continued)

(52) U.S. Cl.
CPC ............. *F02M 59/102* (2013.01); *F01L 1/14* (2013.01); *F02M 59/44* (2013.01);
(Continued)

(58) Field of Classification Search
CPC .. F02M 59/102; F02M 59/44; F02M 63/0001; F04B 53/18; F16C 33/1045; F01L 1/14; F16H 53/06
(Continued)

(56) References Cited

FOREIGN PATENT DOCUMENTS

| CN | 101035984 A | 9/2007 |
|---|---|---|
| CN | 201209560 Y | 3/2009 |

(Continued)

OTHER PUBLICATIONS

JP-05332222-A1 (Handa et al.)(Dec. 14, 1993)(machine translation) [retrieved from Dialog on Nov. 13, 2020] (Year: 1993).*
(Continued)

*Primary Examiner* — Mahmoud Gimie
(74) *Attorney, Agent, or Firm* — Michael Best & Friedrich LLP

(57) ABSTRACT

The invention relates to a roller tappet (1) for a piston pump, in particular for a high-pressure fuel pump, for supporting a pump piston (2) which can move in a reciprocating motion on a cam (3) or eccentric of a drive shaft (4), comprising a tappet body (5) with an end-side recess (6) and two radial bores (7) which lie diametrically opposite one another at the recess (6) and receive a pin (8), on which a roller (10) is rotatably mounted directly or indirectly via a bearing bush (9), wherein at least one radially or obliquely running feed bore (12) is configured in the tappet body (5) in order to supply a lubricating medium to a radial bearing gap (11) which is configured between the roller (10) and the pin (8) or between the roller (10) and the bearing bush (9), which feed bore (12) opens into the recess (6) in the region of an axial bearing gap (13) between the roller (10) and the tappet body (5). According to the invention, the feed bore (12) is connected to an arcuately running lubricating duct (14) which is configured in a surface (15) of the tappet body (5),
(Continued)

which surface (15) delimits the axial bearing gap (13). Furthermore, the invention relates to a piston pump comprising a roller tappet (1) of said type.

12 Claims, 4 Drawing Sheets

(51) Int. Cl.
*F16H 53/06* (2006.01)
*F16C 33/10* (2006.01)
*F01L 1/14* (2006.01)
*F02M 63/00* (2006.01)
*F04B 53/18* (2006.01)

(52) U.S. Cl.
CPC ......... *F16C 33/1045* (2013.01); *F16H 53/06* (2013.01); *F02M 63/0001* (2013.01); *F04B 53/18* (2013.01)

(58) Field of Classification Search
USPC .................................................. 123/446, 508
See application file for complete search history.

(56) References Cited

FOREIGN PATENT DOCUMENTS

| | | | |
|---|---|---|---|
| CN | 202165246 U | 3/2012 | |
| CN | 103270256 A | 8/2013 | |
| CN | 103958879 A | 7/2014 | |
| DE | 3300032 | 7/1984 | |
| DE | 102007012707 | 9/2008 | |
| DE | 102009029297 | 3/2011 | |
| DE | 102012223413 | 6/2014 | |
| DE | 102012223413 A1 * | 6/2014 | ........... F02M 59/102 |
| DE | 102015210815 A1 * | 12/2016 | .......... F16C 33/1045 |
| EP | 2955342 A1 * | 12/2015 | ................ F01L 1/46 |
| EP | 3073066 A1 | 9/2016 | |
| GB | 2548900 A * | 10/2017 | ........... F02M 59/102 |
| JP | 05332222 A * | 6/1993 | ......... F02M 63/0001 |
| JP | 2015502484 A | 1/2015 | |

OTHER PUBLICATIONS

International Search Report for Application No. PCT/EP2017/072468 dated Nov. 22, 2017 (English Translation, 2 pages).

* cited by examiner

ROLLER TAPPET FOR A PISTON PUMP, PISTON PUMP

BACKGROUND OF THE INVENTION

The invention relates to a roller tappet for a piston pump, in particular a high-pressure fuel pump. The roller tappet serves for supporting a pump piston of the piston pump on a cam or eccentric of a drive shaft. The invention further relates to a piston pump, in particular a high-pressure fuel pump for supplying an internal combustion engine with fuel, having such a roller tappet.

A roller tappet of the aforementioned type can be found, for example, in German laid-open specification DE 10 2012 223 413 A1. The known roller tappet has a tappet part which can be supported on a drive device via a roller which is rotatably mounted in the tappet part. In order to minimize the wear in the bearing region and in this way to increase the service life of the pump, there is proposed an improved lubrication of the bearing region via at least one through-passage, which is provided in the tappet part, and a groove. The through-passage connects an inner region of the tappet part, in which the bearing of the roller is arranged, to the outer shell of the tappet part. The through-passage is arranged in such a way that it opens into the groove. Here, the groove is provided in a circumferential region of the tappet part in the inner shell thereof, said circumferential region adjoining an end side of the roller that points in the direction of its axis of rotation, and extends in the direction of the longitudinal axis of the roller tappet. Accordingly, the lubricant which passes into the inner region of the tappet part via the through-passage is primarily fed to an axial bearing gap between the roller and the inner shell of the tappet part.

Taking the above-cited prior art as the starting point, the object on which the present invention is based is to further improve the lubrication of a rotatably mounted roller of a roller tappet for a piston pump, in particular for a high-pressure fuel pump. In particular, lubrication is intended to be ensured under lateral run-on conditions, that is to say in the case of a force component which acts on the roller and which presses the roller axially against the tappet body. This is regularly the case when there is slanting of the cam with respect to the roller tappet, the slanting being attributable to manufacturing and/or assembly tolerances.

SUMMARY OF THE INVENTION

To achieve the object, the roller tappet according to the invention is specified. Also proposed is a piston pump having such a roller tappet.

The roller tappet proposed for a piston pump, in particular for a high-pressure fuel pump, serves for supporting a reciprocatingly movable pump piston on a cam or eccentric of a drive shaft. The roller tappet comprises a tappet body with an end-side recess and two radial bores which are situated diametrically opposite one another at the recess and receive a pin on which a roller is rotatably mounted directly or indirectly via a bearing bush. In order to supply a lubricating medium to a radial bearing gap which is formed between the roller and the pin or between the roller and the bearing bush, at least one radially or obliquely extending feed bore is formed in the tappet body, which feed bore opens into the recess in the region of an axial bearing gap between the roller and the tappet body. According to the invention, the feed bore is connected to a lubricating duct which extends in a circular arc shape and which is formed in a surface of the tappet body that delimits the axial bearing gap.

The lubricating duct extending in a circular arc shape allows distribution of the lubricating medium which passes into the axial bearing gap via the feed bore, with the result that at first the lubrication in the region of the axial bearing gap is improved. Since lubricating medium is supplied to the radial bearing gap via the axial bearing gap, the uniform distribution of the lubricating medium via the axial bearing gap also has an advantageous effect on the lubrication of the radial bearing gap.

The improved lubrication reduces the wear of the roller tappet in the region of the roller bearings, with the result that the roller tappet has an increased robustness. In particular, the wear in the region of a lateral run-on surface of the tappet body that is situated opposite to the end face of the roller is reduced. Furthermore, an undesired temperature increase through frictional heat is counteracted.

The lubricating duct extending in a circular arc shape ensures distribution of the lubricating medium even when the roller conceals the feed bore under lateral run-on conditions. This is because the connection of the lubricating duct to the feed bore forms a kind of bypass which ensures feeding of the lubricating medium even in the case of the roller running on laterally.

The lubricating duct preferably extends around the axis of rotation of the roller in a substantially circular arc shape. In other words, the lubricating medium is distributed in the circumferential direction of the roller. There is advantageously an overlapping region of the lubricating duct with a radial bearing gap between the roller and the pin or between the roller and the bearing bush, with the result that, during operation of the roller tappet, the lubricating medium is drawn directly from the lubricating duct into the radial bearing gap.

With further preference, a recess which widens the feed bore and via which the feed bore is connected to the lubricating duct is formed in the surface of the tappet body that delimits the axial bearing gap. In particular, a connection of the feed bore to the lubricating duct is ensured via the recess in the case of the roller running on laterally, with the result that the feeding of the lubricating medium is not interrupted.

According to a preferred embodiment of the invention, the lubricating duct is formed by a bevel; bordering the radial bore. The formation of the lubricating duct by a bevel simplifies the production of the lubricating duct. This applies in particular since the surface in which the lubricating duct is formed is situated on the inside. Moreover, a further connection of the lubricating duct to a region which conducts the lubricating medium can be created via a bevel bordering the radial bore, with the result that the lubricating medium is not fed exclusively via the feed bore to the lubricating duct and hence to the axial bearing gap.

Alternatively or in addition, it is proposed that the lubricating duct extends counter to the direction of rotation of the roller from the feed bore to an end face of the tappet body. In this case, there is likewise provided a further connection of the lubricating duct to a region which conducts the lubricating medium, with the result that the supply of the axial bearing gap with lubricating medium is also ensured under lateral run-on conditions. If in addition the lubricating duct extends counter to the direction of rotation of the roller, the rotational movement of the roller can be utilized to distribute the lubricating medium in the lubricating duct or in the axial bearing gap, with the result that the lubrication is further optimized.

With preference, the radial bores which are situated diametrically opposite one another at the end-side recess for the tappet body and in which the pin is received are open toward the end face of the tappet body, and the pin is clipped into the radial bores. The clip connection of the pin facilitates the assembly of the roller tappet, with the result that the production is further simplified. Furthermore, the length of the lubricating duct is reduced if the latter is routed to the end face of the tappet body in order to create a further connection to a region which conducts the lubricating medium.

In a development of the invention, it is proposed that the lubricating duct opens into a lubricating pocket which is formed between the tappet body and an end face of the roller that delimits the axial bearing gap. The lubricating duct experiences a widening via the lubricating pocket, with the result that the drawing of lubricating medium into the lubricating duct and thus into the axial bearing gap is improved.

The lubricating pocket is preferably formed by a bevel via which the surface of the tappet body that delimits the axial baring gap merges into the end face of the tappet body. In the configuration as a bevel, the lubricating pocket can be produced in a particularly simple manner. In addition, the drawing of lubricating medium into the lubricating duct or into the axial bearing gap via the end face of the tappet body can be improved.

Since a roller tappet of the above-described type forms two axial bearing gaps, it is proposed that at least two feed bores for supplying with a lubricating medium are provided in the tappet body and open into the end-side recess of the tappet body in the region of the axial bearing gaps. The two feed bores are advantageously each connected to a lubricating duct extending in a circular arc shape in order to distribute the lubricating medium. With further preference, each lubricating duct is additionally connected via a lubricating pocket to a further region which conducts the lubricating medium, with the result that the supply with the lubricating medium takes place via at least two positions, namely the feed bore on the one hand and the lubricating pocket on the other hand.

Additionally proposed is a piston pump, in particular a high-pressure fuel pump for supplying fuel to an internal combustion engine. The piston pump comprises a reciprocatingly movable pump piston which is supported via a roller tappet according to the invention on a cam or eccentric of a drive shaft. Here, the tappet body of the roller tappet is received in a reciprocatingly movable manner in a cylinder bore of a housing part of the piston pump. The use of a roller tappet according to the invention can reduce the wear in the region of the drive mechanism of the pump, thereby increasing the service life of the pump.

The at least one feed bore which is provided in the tappet body and which serves for supplying the radial bearing gap with a lubricating medium is advantageously connected to a pressurized-oil supply line within the engine via the cylinder bore of the housing part. There is therefore no need for a separate lubricating medium to be held available. The pressure prevailing in the pressurized-oil supply line additionally promotes the feeding of the lubricating medium into the region of the roller bearings.

BRIEF DESCRIPTION OF THE DRAWINGS

A preferred embodiment of the invention is explained in more detail below with reference to the appended drawings, in which.

DETAILED DESCRIPTION

Figure 1:
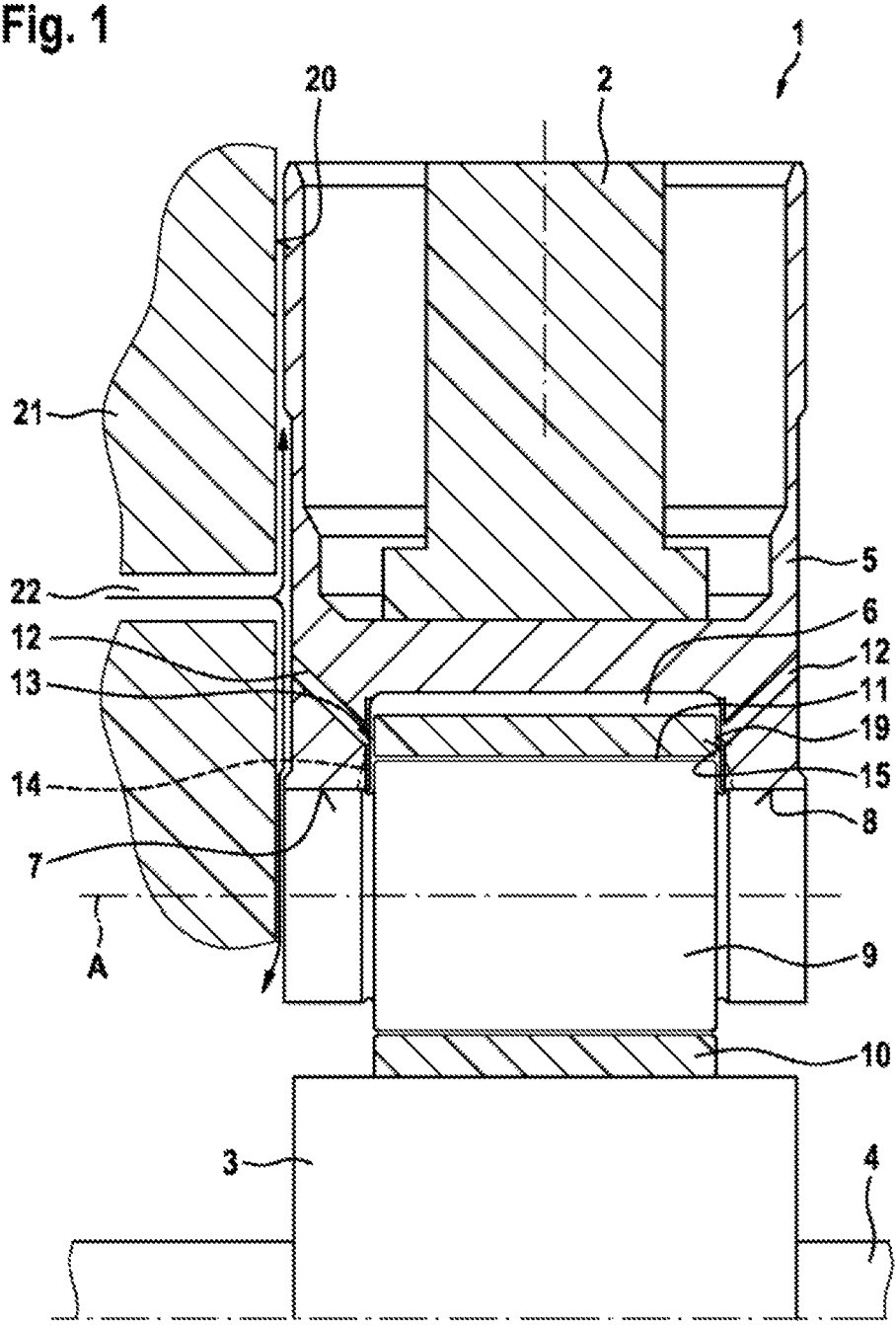
FIG. 1 shows a schematic longitudinal section through a piston pump according to the invention in the region of the roller tappet.

There can be seen in FIG. 1 a piston pump according to the invention having a roller tappet 1 for supporting a reciprocatingly movable pump piston 2 on a cam 3 of a rotating drive shaft 4. The rotation of the drive shaft 4 is converted into a reciprocating movement of the pump piston 2 via the roller tappet 1. For this purpose, the roller tappet 1 comprises a tappet body 5 which is received in a reciprocatingly movable manner in a cylinder bore 20 of a housing part 21 of the piston pump, and a roller 10 which runs around on the outer circumference of the cam 3. The roller 10 is rotatably mounted on a pin 9 which, for connection to the tappet body 5, is clipped into radial bores 7, 8 of the tappet body 5.

In order to supply a lubricating medium to a radial bearing gap 11 which is formed between the roller 10 and the pin 9, a feed bore 12 is provided in the tappet body 5 and extends from an outer circumferential surface of the tappet body 5 to an end-side recess 6 of the tappet body 5 in which the roller 10 is received. The feed bore 12 is connected to a pressurized-oil supply line 22 via the cylinder bore 20, with the result that oil is fed as lubricating medium. The feed bore 12 opens in the region of an axial bearing gap 13, which is delimited by an end face 19 of the roller 10 and a surface 15 of the tappet body 5, into the end-side recess 6 of the tappet body 5. The opening region is situated approximately opposite to the radial bearing gap 11, with the result that the latter is also supplied with the lubricating medium via the feed bore 12. However, slanting of the cam 3 with respect to the roller tappet 1 can occur as a result of manufacturing and/or assembly tolerances, with the result that a force component acts on the roller 10 that presses the roller 10 against the surface 15 of the tappet body 5. In order to prevent a situation in which the feeding of lubricating medium is interrupted by the lateral run-on of the roller 10, the tappet body 5 of the illustrated roller tappet 1 has a lubricating duct 14 which extends in a circular arc shape around the axis of rotation A of the roller 10 and which is connected to the feed bore 12 via a recess 16 (see also FIG. 5).

Figure 2:
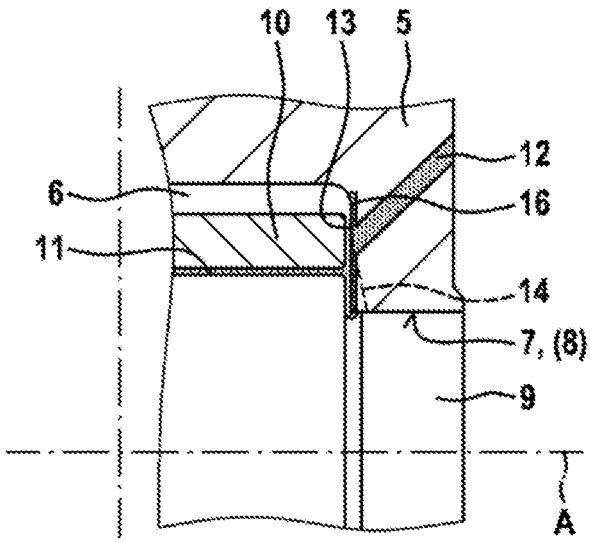
FIG. 2 shows an enlarged detail of FIG. 1 in the region of the axial bearing gap.
Figure 5:
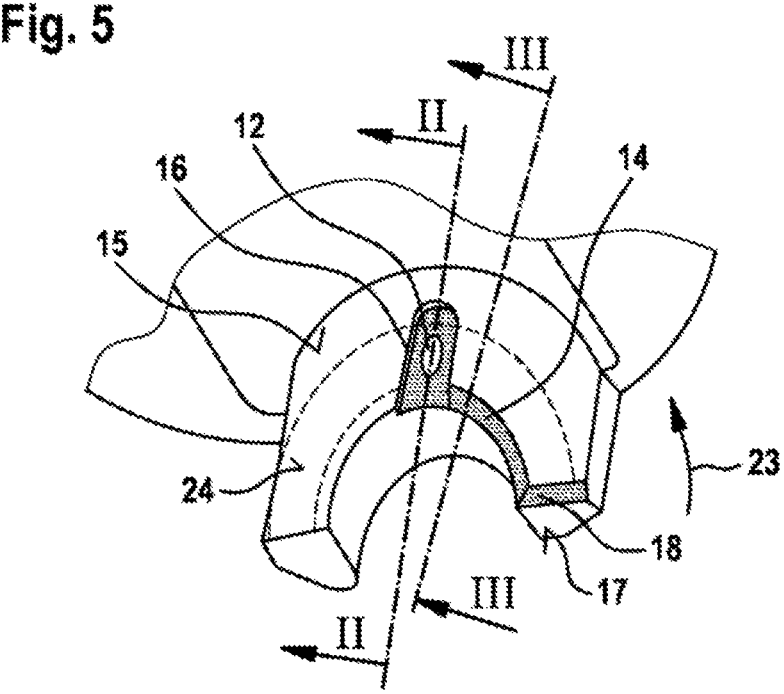
FIG. 5 shows a perspective illustration of the tappet body of the roller tappet of FIG. 1.
Figure 6:
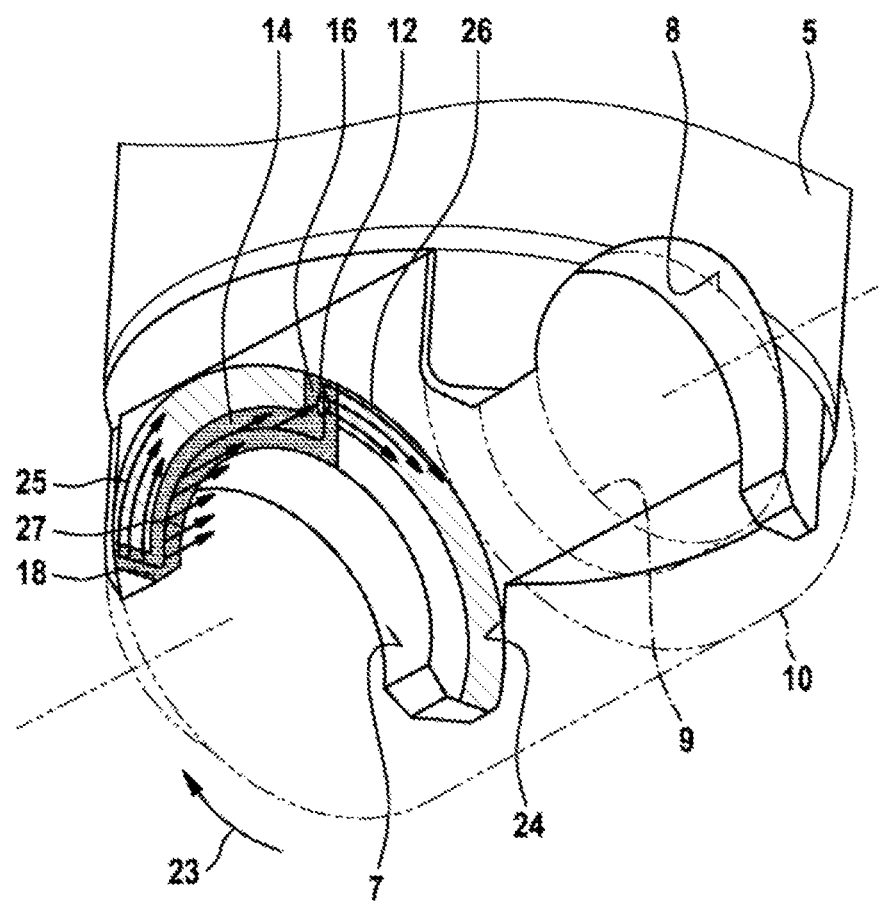
FIG. 6 shows a further perspective illustration of the tappet body of the roller tappet of FIG. 1.

As can be seen in particular from FIGS. 2 and 5, the recess 16 extends from a radially outer circle line, which delimits the lateral run-on surface 24, to the radial bore 7 or 8. A connection of the feed bore 12 to the lubricating duct 14 is created in this way and remains even when the roller 10 is pressed against the surface 15 of the tappet body 5 in the region of the lateral run-on surface 24.

Figure 3:
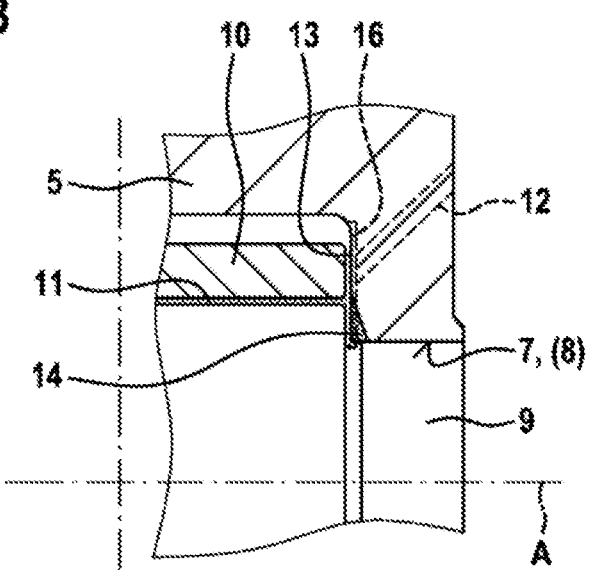
FIG. 3 shows a schematic longitudinal section through the roller tappet of FIG. 1 outside the feed bore which opens into the axial bearing gap.
Figure 4:
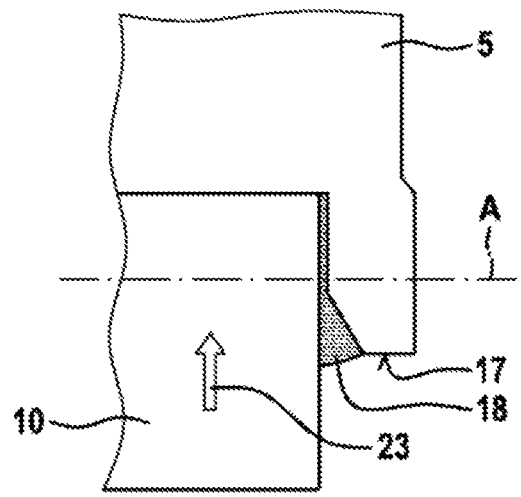
FIG. 4 shows a schematic side view of the roller tappet of FIG. 1.

In order to simplify the production of the lubricating duct 14, the latter is formed as a bevel which borders the radial bore 7 or 8. The width of the bevel is advantageously chosen such that the bevel extends from the radial bore 7 or 8 to the lateral run-on surface 24, with the result that the drawing of lubricating medium into the radial bearing gap is improved (see FIG. 3). The bevel extends to an end face 17 of the tappet body 5 in the circumferential direction, with the result that there is thereby provided a further connection of the lubricating duct 14 to a region which conducts the lubricating medium (see FIG. 5). In the region of the end face 17, the lubricating duct 14 opens into a lubricating pocket 18 which is formed between the end face 19 of the roller 10 and the tappet body 5 by a further bevel (see FIG. 4).

During operation of the piston pump, the roller 10 runs around on the cam 3 of the drive shaft 4. Here, the roller 10 rotates about an axis of rotation A. In order to use the rotational movement of the roller 10 such that it provides assistance in the distribution of the lubricating medium, the lubricating duct 14 is routed from the feed bore 12, or recess 16 which widens the feed bore 12, counter to the direction of rotation 23 of the roller 10 to the end face 17 of the tappet body 12. Lubricating medium present there is thus drawn into the axial bearing gap 13 via the lubricating pocket 18 (see arrows 25). Lubricating medium which passes into the axial bearing gap 13 via the feed bore 12 and the recess 16 is also uniformly distributed over the lateral run-on surface 24 (see arrows 26) via the rotational movement of the roller 10. At the same time, lubricating medium is pressed into the lubricating duct 14 via which the radial bearing gap 11 is supplied with lubricating medium (see arrows 27).

What is claimed is:

1. A roller tappet (1) for a piston pump, for supporting a reciprocatingly movable pump piston (2) on a cam (3) or eccentric of a drive shaft (4), the roller tappet (1) comprising a tappet body (5) with an end-side recess (6) and two radial bores (7, 8) which are situated diametrically opposite one another at the recess (6) and receive a pin (9) on which a roller (10) is rotatably mounted directly or indirectly via a bearing bush, wherein at least one radially or obliquely extending feed bore (12) is formed in the tappet body (5) for supplying a lubricating medium to a radial bearing gap (11) which is formed between the roller (10) and the pin (9) or between the roller (10) and the bearing bush, which feed bore opens into the recess (6) in a region of an axial bearing gap (13) between the roller (10) and the tappet body (5),
characterized in that the feed bore (12) is connected to a lubricating duct (14) which extends in a circular arc shape and which is formed by a bevel in a surface (15) of the tappet body (5), the surface (15) bordering the radial bore (7, 8) and delimiting the axial bearing gap (13).

2. The roller tappet (1) as claimed in claim 1,
characterized in that the lubricating duct (14) extends around an axis of rotation (A) of the roller (10) in a substantially circular arc shape.

3. The roller tappet (1) as claimed in claim 1,
characterized in that the lubricating duct (14) covers the radial bearing gap (11) between the roller (10) and the pin (9) or between the roller (10) and the bearing bush at least in certain regions.

4. The roller tappet (1) as claimed in claim 1,
characterized in that a recess (16) which widens the feed bore (12) and via which the feed bore (12) is connected to the lubricating duct (14) is formed in the surface (15) of the tappet body (5) that delimits the axial bearing gap (13).

5. The roller tappet (1) as claimed in claim 1,
characterized in that the radial bores (7, 8) which are situated diametrically opposite one another at the end-side recess (6) of the tappet body (5) and in which the pin (9) is received are open toward the end face (17) of the tappet body (5), and the pin (9) is clipped into the radial bores (7, 8).

6. The roller tappet (1) as claimed in claim 1,
characterized in that the lubricating duct (14) opens into a lubricating pocket (18) which is formed between the tappet body (5) and an end face (19) of the roller (10) that delimits the axial bearing gap (13).

7. The roller tappet (1) as claimed in claim 6,
characterized in that the lubricating pocket (18) is formed by a bevel via which the surface (15) of the tappet body (5) that delimits the axial bearing gap (13) merges into the end face (17) of the tappet body (5).

8. A piston pump, comprising a reciprocatingly movable pump piston (2) which is supported via a roller tappet (1) as claimed in claim 1 on a cam (3) or eccentric of a drive shaft (4), wherein the tappet body (5) of the roller tappet (1) is received in a reciprocatingly movable manner in a cylinder bore (20) of a housing part (21) of the piston pump.

9. The piston pump as claimed in claim 8,
characterized in that the at least one feed bore (12) which is provided in the tappet body (5) is connected to a pressurized-oil supply line (22) within the engine via the cylinder bore (20).

10. The roller tappet (1) as claimed in claim 1,
characterized in that the lubricating duct (14) extends counter to the direction of rotation of the roller (10) from the feed bore (12) to an end face (17) of the tappet body (5).

11. The roller tappet (1) as claimed in claim 10,
characterized in that the radial bores (7, 8) which are situated diametrically opposite one another at the end-side recess (6) of the tappet body (5) and in which the pin (9) is received are open toward the end face (17) of the tappet body (5), and the pin (9) is clipped into the radial bores (7, 8).

12. The roller tappet (1) as claimed in claim 10,
characterized in that the radial bores (7, 8) which are situated diametrically opposite one another at the end-side recess (6) of the tappet body (5) and in which the pin (9) is received are open toward the end face (17) of the tappet body (5), and the pin (9) is clipped into the radial bores (7, 8).

* * * * *